J. B. GOING.
HORSESHOE

No. 188,620. Patented March 20, 1877.

ATTEST:
Henry A. Dierkes
Arthur C. Fraser

INVENTOR:
John B. Going
by his attys
Burke & Fraser

UNITED STATES PATENT OFFICE.

JOHN B. GOING, OF NEW YORK, N. Y., ASSIGNOR TO HIMSELF AND JAMES A. GOING, OF SAME PLACE, AND WILLIAM S. HITCH, OF LAUREL, DEL.

IMPROVEMENT IN HORSESHOES.

Specification forming part of Letters Patent No. 188,620, dated March 20, 1877; application filed January 10, 1877.

*To all whom it may concern:*

Be it known that I, JOHN B. GOING, of the city, county, and State of New York, have invented certain Improvements in Horseshoes, of which the following is a specification:

This invention relates to that class of horseshoes in which a sheet or strip of rubber or other elastic material is interposed and clamped between two metal plates, all of a horseshoe shape, to form an elastic shoe; and the novel feature of the invention consists in the means used for attaching the plates together, which means will be hereinafter fully described.

Figure 1:
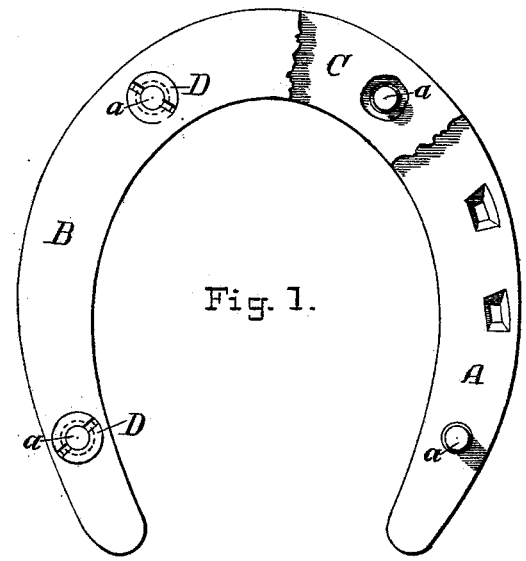
Figure 2:
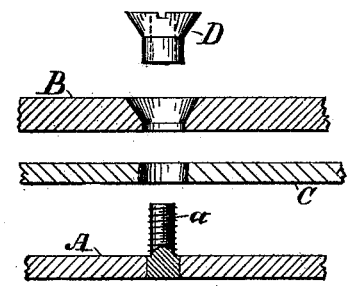
Figure 3:
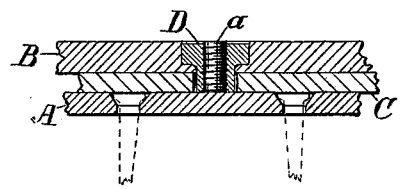

In the drawings, Figure 1 is a plan or bottom view of a horseshoe provided with my improved fastening. Figs. 2 and 3 are detached and enlarged sectional views, illustrating the invention.

I am aware that horseshoes have been heretofore constructed of two metal plates and an interposed sheet of rubber, as herein shown, and that these have been secured together in various ways. I therefore wish it understood that I only claim as my present invention the peculiar arrangement or device for securing the parts together, in combination with the parts themselves. This combination I will now describe.

Let A represent the upper metal plate, or that next the horse's hoof; B, the lower plate, or that next the ground; and C, the rubber plate interposed between them. Secured rigidly to the plate A, and projecting therefrom, are screws or threaded studs *a a*, preferably four or more. The heads or attached ends of these studs are somewhat larger than their threaded shanks, and in securing them to the plate they may be riveted on both sides, if necessary, as shown in Fig. 2. D D are threaded sleeves or headed female screws, arranged to fit the studs *a a*, and nicked for the screw-driver, as represented. The rubber is perforated with holes to correspond with the studs *a a*, and large enough to receive the female screws D D, and the plate B is correspondingly perforated, and the holes countersunk, to receive the heads of the screws D D.

The plate A is nailed to the hoof in the usual manner, with the studs *a a* projecting. The rubber is now put on, and after it the plate B, the holes engaging the studs. The female screws D D are then inserted and screwed down snugly on the studs as far as they will go. They should be just so long that when screwed firmly down they will bind the three plates together, and only slightly compress the rubber. The studs should be of the same length.

The beating of the horse's hoof upon the pavement serves to rivet the tip of the stud down upon the female screw, and as both wear down together this riveting is kept up, and the sleeve cannot be displaced or come off.

The head of the sleeve D may be flared, as in Fig. 2, or squared, as in Fig. 3.

Having thus described my invention, I wish to especially disclaim the horseshoe built up of two metal plates and an interposed rubber plate, as that is not new; but

What I do claim, and desire to secure by Letters Patent, is—

The combination, in a horseshoe, of the upper plate A, lower plate B, and rubber plate C with the riveted screw-studs *a a* and headed female screws or threaded sleeves D D, all constructed and arranged to form a substantial fastening, as herein set forth.

In witness whereof I have hereunto signed my name in the presence of two subscribing witnesses.

JOHN B. GOING.

Witnesses:
HENRY CONNETT,
OLE H. HOLBERG.